July 30, 1929.  A. RENSHAW  1,722,861

METHOD OF MAKING TRANSMISSION CHAINS

Filed Dec. 8, 1927  2 Sheets-Sheet 1

INVENTOR
Alfred Renshaw
BY
Gill + Jennings
ATTORNEYS

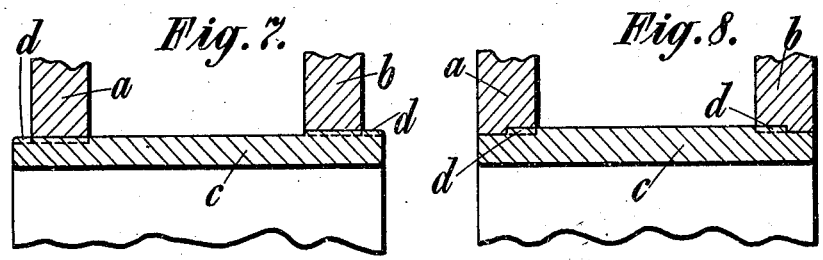

Patented July 30, 1929.

1,722,861

UNITED STATES PATENT OFFICE.

ALFRED RENSHAW, OF MANCHESTER, ENGLAND, ASSIGNOR TO HANS RENOLD LIMITED, OF MANCHESTER, ENGLAND, A BRITISH COMPANY.

METHOD OF MAKING TRANSMISSION CHAINS.

Application filed December 8, 1927, Serial No. 238,598, and in Great Britain February 28, 1927.

The present invention relates to transmission chains and more particularly to the class of chain which has alternate links each consisting of two side plates connected together by two hollow bushes, and the object of the invention is to prevent rotation of the bushes relatively to the side plates within which they are secured. In other words, the invention is primarily concerned with the method of securing the side plates of the so-called inner combination of transmission chains in position on the ends of the hollow bushes.

It has been realized that it is important to prevent lateral spreading of the inner side plates on their bushes as this leads to binding of the inner side plates against the side plates of the outer links with consequent wear, heating and loss of power. Ususally the side plates are placed upon the bushes with a force fit with a certain tolerance limit, and often the plates are forced on to the bushes until they come into contact with definite shoulders. Also, however, attempts have been made to secure the side plates positively, for example by riveting over the ends of the hollow bushes. Also, the ends of solid studs or rivets have been knurled or formed with shallow splines completely around the circumference before being forced into their link plates. It has now been found, however, that the tendency for the side plates to leave the bushes is very often largely due to a twisting action between the side plate and the bush which culminates in a screwing action causing the side plates to spread sideways. In other words the resistance of the bush to torsion within the side plate is found to play a very important part in resisting the spreading of the side plates. Most known methods of preventing turning of the bush within the side plates require that the bushes and the holes in the side plates shall be of non-circular shape so as to produce a definite keying action. This requirement increases the difficulty and expense of manufacturing and assembling the parts of a chain.

According to the present invention, advantage is taken of the fact that the material of the hollow bushes, studs or rivets is relatively hard compared with that of the side plates or washers, and, in fact, the bushes or studs are shaped with projections for producing the keying effect which actually cut or broach corresponding grooves or keyways in the side plates or washers when the latter are forced on to the bushes or studs. There may be any number of projections but they are spaced apart so that between each pair of projections there is a substantial cylindrical seating surface. The holes in the side plates are made as plain circular holes having a normal force fit on the said seating surface of the bushes. The novel method has the advantage that as the holes in the plate are circular there is no need to place the side plate and the bush in any definite angular relation to cause projections and keyways to engage. On the other hand, the two parts can be placed together in any angular relation, and then the side plates are forced on to the bush by a single machine operation as is now usual, and the keyway is cut during that single operation. Metal is forced out of the side plates by the keys or projections on the bushes, thus providing a joint yielding a positive resistance to torsion between the bushes and the plates, while still retaining the force fit between the cylindrical surfaces of the bush and the metal of the plate around the hole which resists outward movement of the plate. Thus the usual simple method of manufacture and assembly may be employed when the present invention is used. Furthermore, the ample cylindrical seating surfaces on the bushes between the projections in conjunction with the circular holes in the plates, enable substantially the same accuracy to be obtained of the various component parts and particularly of the pitch of the assembled chain as with the usual plain cylindrical bushes.

The bushes employed may be made from solid metal as by turning or pressing, or they may be made by coiling pieces of metal strip of an appropriate section.

In order that the invention may be clearly understood and readily carried into effect, some forms of bushes with the side plates secured in accordance with the invention will be described by way of examples with reference to the accompanying drawings, wherein:—

Figure 3 is a part section showing a slightly modified form of construction; while Figures 4, 5, 6, 7 and 8 are similar views showing yet further modifications.

In all of these drawings, the invention is assumed as applied to the so-called inner combination of a sprocket chain, that is to say, to the elements each consisting of two side plates $a$, $b$ connected together by two hollow bushes $c$.

Figure 1:
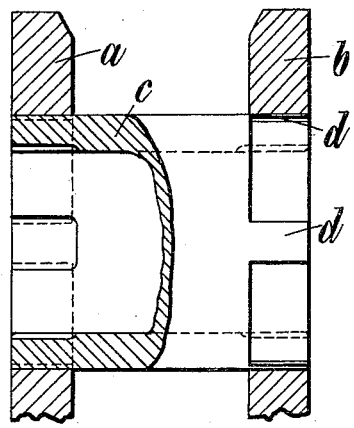
Figure 1 is an elevation showing part of the side plates in section in the vicinity in which the bush is secured with the bush itself half in section.
Figure 2:
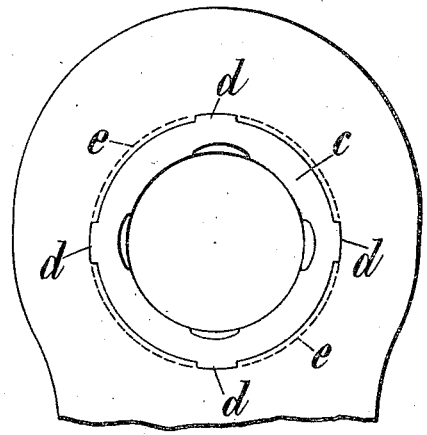
Figure 2 is an end view showing the bush employed.

In Figures 1 and 2, for example, the bush $c$ is generally of a plain cylindrical shape with one or more projections $d$, shown in these figures as formed at both ends of the bush $c$, although it is clear that they could be formed at one end only. In Figure 1 in fact, the bush $c$ is shown with reduced neck portions at either end, and the projections $d$ project from the neck portion and are of the same diameter as the central body portion of the bush $c$. The projections $d$ are shown as standing up from the neck portions and are formed, for instance, by pressing into the bore of the bush $c$ a notched or fluted tool which acts to force the metal out from the bush to provide the spaced projections $d$. During the operation the bush end is surrounded by a shroud which has cavities spaced to correspond to the ribs of the fluted tool and of such a shape as to give the desired form to the projections. They may, however, be formed in any desired manner; as an alternative, the keys or projections $d$ may be formed on the bushes by coining or pressing in the segments of the neck of the bush between the keys. The bush is supported on a mandrel placed through its bore, and jaws similar to those of a three- or four-jaw chuck are made to close in radially on to the ends of the plain bush. There are small gaps between adjacent jaws and by the exercise of considerable pressure the jaws make depressions, the metal undisturbed in the gaps forming the keys or projections. The metal displaced by the pressure flows axially along the bush lengthening the latter and may be removed or not as desired by a subsequent operation. It is important to note, however, that between the projections $d$ there is in all cases ample cylindrical seating surface as at $e$ around the neck of the bush, and the holes in the side plate are made a force fit on the cylindrical surfaces $e$. Owing to this, the upstanding projections $d$ push the metal out of the side plate forming those grooves or keyways. The projections $d$ may be of circular, part-circular, square, or of V-shape, as seen in an end view corresponding to Figure 2 or of any other form. There may be one projection or any number at one or both ends of the bush. There are, of course, shown in Figure 2, four such projections uniformly spaced around the end of the bush. It will be noted that in Figure 1 the axial length of the neck portion is the same as the width of the link plate $b$, so that the outer ends of the bushes are flush with the outer sides of the plates $a$, $b$. It is, however, preferred, even when the ends of the bushes are assembled flush with the outer sides of the plates, to make the length of the neck of the bush slightly greater than the thickness of the plates and to join the neck on to the body by a fillet or radius rather than to have a square shoulder as shown in Figure 1. Then any tendency to the formation of cracks at the shoulder in the heat treatment of the bush is avoided.

Figure 3:
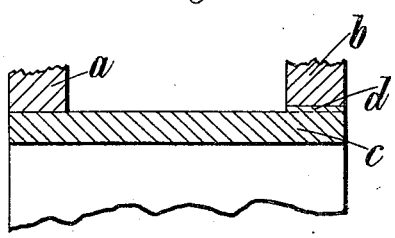
Figure 4:
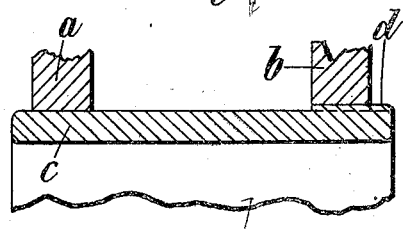
Figure 5:
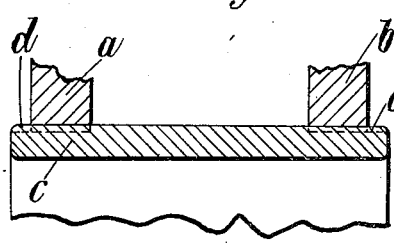
Figure 6:
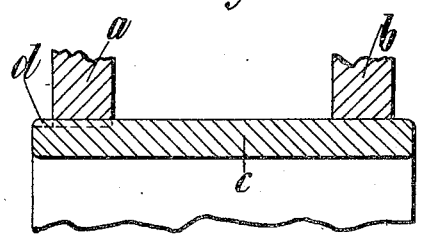

In Figure 3 the projections $d$ are shown at one end only, and in that construction there is no neck to the bush, the projections $d$ standing up from the uniform cylindrical outer surface of the bush. Here again, however, the ends of the bush are flush with the outer surfaces of the end plates $a$, $b$. Figure 4 shows a construction generally similar to Figure 3 except that the ends of the bushes $c$ project outwardly beyond the outer surface of the link plates $a$. $b$. Figure 5 shows a construction generally similar to that of Figure 1 except that here the bush extends at both ends outwardly beyond the outer surfaces of the plates $a$, $b$. Figure 6 shows a construction quite similar to that of Figure 5 except that the projections $d$ are employed only at the left-hand end of the bush. Figure 7 shows a modified form of the arrangement shown in Figure 6. Here, the bush projects at both ends beyond the side plates, but has a neck portion with projections $d$, as in Figures 1 and 5, at the left-hand end, but at the right-hand end has projections $b$ standing up from the cylindrical body portion of the bush, as seen in Figures 3 and 4. Figure 8 shows another form of that illustrated in Figures 1 and 2, the only difference being that in this case the projections $d$ on the neck ends of the bushes $c$ are of such an axial length as only to force their way about half-way through the side plates $a$ and $b$.

Of course, in all forms of construction described the bushes may be turned or otherwise formed from solid metal or tubing, or they may be formed from flat plates by drawing, or may be formed by coiling from pieces of strip material which may be rolled to an appropriate section.

Although as has already been explained, the invention is primarily concerned with fixing side plates of the so-called inner combinations of transmission chains on the hollow bushes, the invention is not limited to that particular application as it may also be applied to hollow studs for the outer links or for securing washers on the ends of hollow studs. In such cases the studs or rivets are made of relatively hard material and are formed with one or more projections for cutting metal from the side plates or washers to form a groove or keyway.

I claim:—

1. A method of making a transmission chain element which consists in forming external projections around the periphery at an end of a tubular jointing member to leave substantial part-cylindrical surfaces between said projections, perforating a side member with a circular aperature accurately to fit said part-cylindrical surfaces and forcing said side member on to said end of the jointing member so that said projections cut or broach corresponding grooves in the metal of said side member surrounding said jointing member.

2. A method of making an inner link combination of a transmission chain which consists in forming external projections spaced around the periphery of a pair of tubular bushes at their ends to leave substantial part-cylindrical surfaces between said projections, perforating a pair of side plates with circular holes accurately to fit said part-cylindrical surfaces and forcing said side plates on to the ends of said bushes so that said projections cut or broach corresponding grooves or keyways in the metal of said side plates around the respective holes.

3. A method of making a transmission chain element which consists in coiling a strip of metal to form a tubular bush, forming external projections spaced around the periphery at the ends of said bush to leave substantial part-cylindrical surfaces between said projections, perforating a pair of side plates with circular holes accurately to fit said part-cylindrical surfaces and forcing said side plates on to the ends of said bush so that said projections cut or broach corresponding grooves or keyways in the metal of said side plates around the respective holes.

In witness whereof I hereunto subscribe my name this 25th day of November, 1927.

ALFRED RENSHAW.